(12) United States Patent
Bax (10) Patent No.: US 8,085,088 B2
(45) Date of Patent: Dec. 27, 2011

(54) QUADRATURE SIGNAL DEMODULATOR CIRCUITRY SUITABLE FOR DOPPLER ULTRASOUND

(75) Inventor: Ronald F. Bax, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 126 days.

(21) Appl. No.: 12/397,938

(22) Filed: Mar. 4, 2009

(65) Prior Publication Data

US 2010/0225386 A1 Sep. 9, 2010

(51) Int. Cl.
*H03D 3/00* (2006.01)
(52) U.S. Cl. ......... 329/304; 329/300; 329/306; 329/315
(58) Field of Classification Search .................. 329/300, 329/304, 306, 315
See application file for complete search history.

(56) References Cited

U.S. PATENT DOCUMENTS

| | | | |
|---|---|---|---|
| 4,550,607 A | 11/1985 | Maslak et al. | |
| 5,555,534 A | 9/1996 | Maslak et al. | |
| 5,761,615 A * | 6/1998 | Jaffee | 455/314 |
| 5,896,060 A | 4/1999 | Ovard et al. | |
| 6,055,286 A * | 4/2000 | Wu et al. | 375/375 |
| 7,760,833 B1 * | 7/2010 | Brunner | 375/354 |
| 2002/0141513 A1 * | 10/2002 | England | 375/326 |
| 2005/0089120 A1 | 4/2005 | Quinlan et al. | |
| 2007/0087704 A1 * | 4/2007 | Gilberton | 455/114.3 |
| 2007/0217549 A1 | 9/2007 | Chang et al. | |
| 2008/0094109 A1 * | 4/2008 | Farjad-rad et al. | 327/99 |

OTHER PUBLICATIONS

"DC to 50 MHz, Dual I/Q Demodulator and Phase Shifter AD8333," Analog Devices, Inc., Copyright 2005-2007, 28 pages.
"DC to 25 MHz, Quad I/Q Demodulator and Phase Shifert AD8339," Analog Devices, Inc., Copyright 2007, 29 pages.
"Octal LNA/VGA/AAF/ADC and Crosspoint Switch AD9271," Analog Devices, Inc., Copyright 2007, 58 pages.
International Preliminary Report for PCT Application No. PCT/US2010/025864, 1 page.
Written Opinion of the International Searching Authority for PCT Application No. PCT/US2010/025864, 4 pages.

* cited by examiner

*Primary Examiner* — Arnold Kinkead
*Assistant Examiner* — Richard Tan (57) ABSTRACT

Quadrature signal demodulator circuitry for demodulating multiple related input signals into respective pairs of quadrature signals for selective combining to provide a composite pair of quadrature signals with a maximized signal-to-noise ratio (SNR).

16 Claims, 8 Drawing Sheets

QUADRATURE SIGNAL DEMODULATOR CIRCUITRY SUITABLE FOR DOPPLER ULTRASOUND

BACKGROUND

1. Field of the Invention

The present invention relates to signal demodulation circuits, and in particular, to quadrature signal demodulators for use in phased array applications, including ultrasound.

2. Related Art

Ultrasound or SONAR pressure waves are generated by feeding a radio frequency (RF) transmit signal voltage to groups of piezoelectric elements in an array. These elements convert the electrical energy to acoustic energy. Such energy conversion is reciprocal in nature, since the same elements, as well as additional elements, convert reflected acoustic energy into electrical energy. Generally, this converted reflected energy is then amplified by a sensitive signal receiver. If the timing or phase of the individual elements is somehow adjusted to form a transmit and/or receive "lens", the process is called a "phased array" and is used in phased array ultrasound, phased array sonar and phased array radar applications. When circuitry, e.g., digital signal processors (DSPs) create, transmit, focus, steer and detect with the reflected energy beams, the process is called "digital beamforming".

Doppler frequency shift in ultrasound or sonar is used to determine the velocity of a target relative to the observer. In medical ultrasound applications, the target is usually a moving bolus or volume of blood. If blood flows exactly toward the transmitted beam, the receive signal is shifted up in frequency (positive Doppler shift) by an amount proportional to the product of twice the directed target velocity and the transmitted signal frequency, divided by the velocity of sound in blood. If the directed or effective target velocity is not exactly toward the transmitted signal beam, the frequency shift is multiplied by the cosine of the angle between the instantaneous target velocity vector and that of the transmitted signal beam. Similarly, Doppler shift is negative (frequency decrease) if the directed target velocity is away from the transmitted signal beam. This can be expressed as follows:

$$\Delta f = (2 V t \cos \Phi)(f_{TX})/c$$

$\Delta f$=Doppler frequency shift $V_t \cos \Phi$=directed target velocity including the angular component $f_{TX}$=transmit frequency c=velocity of sound in blood Blood is predominantly water, and the velocity of sound in water is approximately 1,580 meters per second (m/sec.) or 1.58 millimeters per microsecond (mm/usec). Assuming the operating frequency, i.e., the transmitted signal frequency, is three megahertz (3 MHz) and normal blood flow in the carotid arteries of the neck varies between 30 and 80 centimeters per second (cm/sec.) throughout the cardiac cycle, and assuming the blood flow is directed 45 degrees from the transmitted signal beam, the resultant Doppler shift, based upon the equation above, will vary between 800 and 2140 Hertz, both of which are well within the audible signal range. When the carotid cross-section is partially occluded by plaque, the blood velocity increases to maintain flow and Doppler shift increases. An unusual shift will be audible to the sonographer and visible when displayed on a color monitor. If the obstruction creates turbulence or cavitation, the effect will be even more noticeable.

SUMMARY

In accordance with the presently claimed invention, quadrature signal demodulator circuitry is provided for demodulating multiple related input signals into respective pairs of quadrature signals for selective combining to provide a composite pair of quadrature signals with a maximized signal-to-noise ratio (SNR).

In accordance with one embodiment of the presently claimed invention, quadrature signal demodulator circuitry includes:

a plurality of quadrature signal demodulator circuits each of which includes signal routing circuitry responsive to a respective one of a plurality of received signals by providing corresponding first and second input signals, and signal mixing circuitry coupled to the signal routing circuitry and responsive to the first and second input signals, one or more clock signals and respective one or more phase control signals by providing respective first and second output signals which are related to the first and second input signals, have substantially mutually quadrature signal phases, and are respective ones of first and second pluralities of output signals, respectively, wherein first and second ones of the first plurality of output signals have a first mutual signal phase difference, first and second ones of the second plurality of output signals corresponding to the first and second ones of the first plurality of output signals have a second mutual signal phase difference, and the first and second mutual signal phase differences are substantially equal; and output signal combining circuitry coupled to the plurality of quadrature signal demodulator circuits and responsive to the first and second pluralities of output signals by providing first and second resultant signals, respectively.

In accordance with another embodiment of the presently claimed invention, quadrature signal demodulator circuitry includes:

a plurality of quadrature signal demodulator means each of which includes signal router means for routing a respective one of a plurality of received signals to provide corresponding first and second input signals, and signal mixer means for receiving the first and second input signals, one or more clock signals and respective one or more phase control signals and in response thereto providing respective first and second output signals which are related to the first and second input signals, have substantially mutually quadrature signal phases, and are respective ones of first and second pluralities of output signals, respectively, wherein first and second ones of the first plurality of output signals have a first mutual signal phase difference, first and second ones of the second plurality of output signals corresponding to the first and second ones of the first plurality of output signals have a second mutual signal phase difference, and the first and second mutual signal phase differences are substantially equal; and output signal combiner means for combining the first and second pluralities of output signals to provide first and second resultant signals, respectively.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Maximizing transmit signal-to-noise ratio (SNR) in phased array ultrasound or SONAR requires focusing the transmitted signal beam within an intended volume of interest. This is done by phasing or time delaying the signal to individual array elements, thereby creating an acoustical lens. During reception, the SNR becomes maximized by aligning the phase of each individual receive channel signal prior to summation of the signal amplitudes for each channel. Ideally, the noise in each received channel is uncorrelated with noise in other channels. Amplitude summation improves the SNR by the square root of the number of added channels, e.g., ideally producing a three decibel (3 dB) improvement each time the channel count is doubled.

Figure 1:
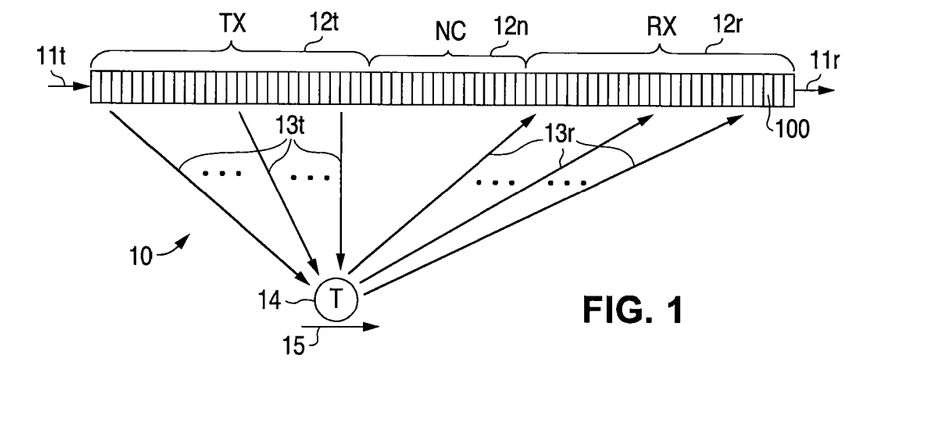
FIG. 1 illustrates a use of a piezoelectric array to detect and track a moving target in accordance with the presently claimed invention.

Referring to FIG. 1, in accordance with one embodiment of the presently claimed invention, a piezoelectric array 10 is driven with one or more transmit signals 11t which are typically continuous wave (CW) signals. Typically, one end portion 12t of the array 10 is driven by the transmit signals 11t, with each individual piezoelectric element 100 emitting a respective sound wave 13t. Another end portion 12r of the array 10 a number of elements 100 are used for receiving reflected sound waves 13r from the target 14 moving along a velocity vector 15. These elements provide one or more receive signals 11r for processing (discussed in more detail below). An exemplary array 10 includes 64 elements 100, of which 25 elements will be transmit elements 12t and another 25 elements will be receive elements 12r, with 14 unused elements 12n separating them to minimize direct transmit-to-receive crosstalk.

In CW Doppler there is no range information. If range information is required, pulsed Doppler can be used, with the elements driven by narrow transmit signal pulses. Most or all of these same elements 100 can be used to both transmit the original signal pulses as well as receive the reflected pulses, since "separation" for minimizing direct transmit-to-receive crosstalk is achieved temporally instead of spatially. The receive signals are generally range-gated and the receive signal returns through either a B-mode path or through a CW Doppler path with sample-and-hold signal processing.

To detect a CW Doppler frequency shift, the receive signal 11r is compared to a sample of the CW carrier used to create the transmit signal 11t. One common way is to multiply the two signals together in a double balanced mixer. In accordance with well known techniques, proper signal mixing produces sum and difference signal frequencies, with the magnitudes of the original two signals being highly attenuated. The sum frequencies, all other harmonic frequencies or high frequency cross-products are removed downstream by lowpass filtering, with the low frequency difference or baseband Doppler signal being left substantially intact. To further suppress spurious frequencies, receive signals are sometimes first mixed down to a convenient intermediate frequency (IF), narrow-band filtered with a bandpass filter (BPF), and then mixed again down to baseband frequency.

As discussed in more detail below, a Doppler demodulator in accordance with the presently claimed invention rotates or aligns the phase of each individual receive channel signal, performs baseband demodulation by heterodyning the signal with a system clock signal, and coherently sums a selected number of properly phased baseband signals, thereby maximizing the SNR as discussed above. Based on factors, such a position of a transmit and receive element position within the array 10 and the depth of focus (i.e., the distance to the target 14), the system estimates the required phase shift for each channel element 100 needed to align the baseband in-phase I and quadrature Q signals with the baseband I and Q signals of the other channels prior to their summations (magnitude). If the RF signal is shifted in phase, the I and Q baseband signals will exhibit the same nominal phase shift. Baseband in-phase signal summation (magnitude) adds the signals directly, while uncorrelated noise adds as the square root of the number of added channels. Accordingly, as channels are correctly aligned and added, the SNR increases as the square root of the number of channels.

Figure 2:
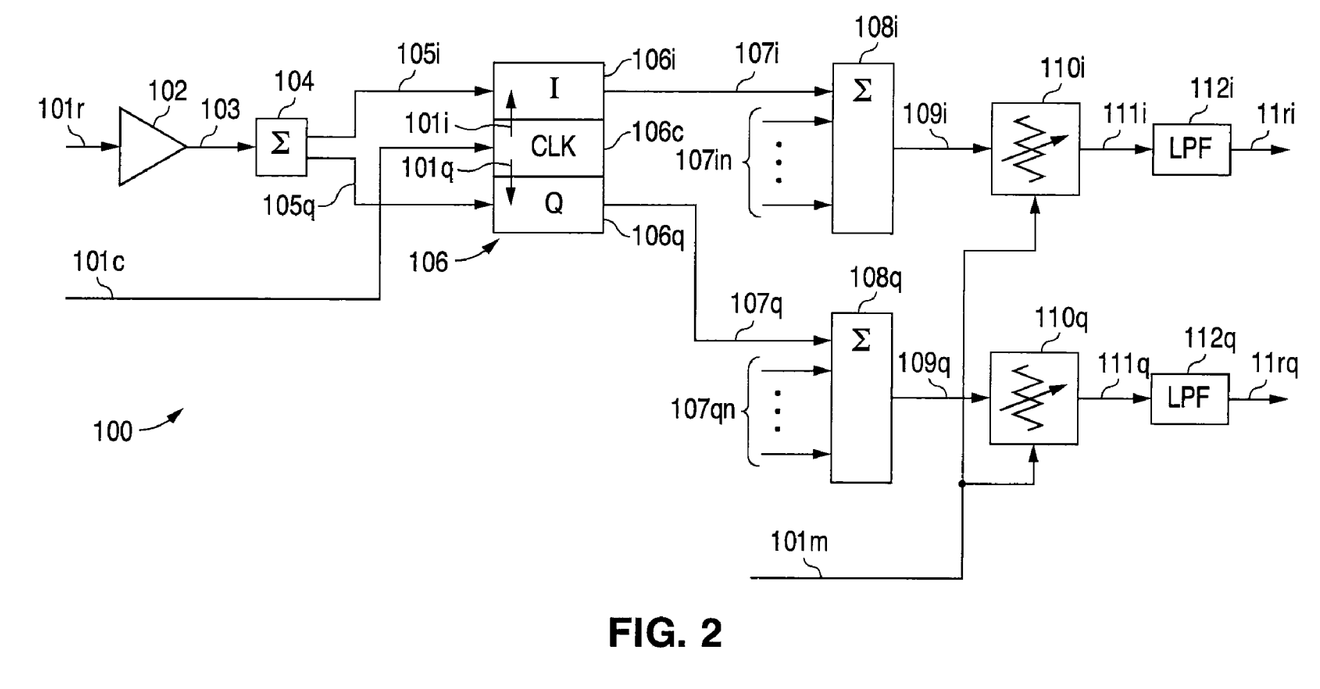
FIG. 2 is a functional block diagram of quadrature signal demodulator circuitry in accordance with various embodiments of the presently claimed invention.

Referring to FIG. 2, an exemplary embodiment of a receive channel 100 in accordance with the presently claimed invention includes a low noise amplifier (LNA) 102, a signal divider (magnitude) 104 and quadrature signal demodulators circuitry 106, which includes I signal circuitry 106i, Q signal circuitry 106q and clock circuitry 106c (discussed in more detail below). The clock circuitry 106c provides quadrature clock signals 101i, 101q to the I signal 106i and Q signal 106q circuitry. The resulting I signal 107i and Q signal 107q are then summed in magnitude with I signals 107in and Q signals 107qn from other elements 100 in the receiver portion 12r of the array 10 in respective signal summing (magnitude) circuits 108i, 108q. The resulting summation signals 109i, 109q can, if desired, be scaled in magnitude by respective scaling circuits 110i, 110q in accordance with one or more magnitude scaling control signals 101m. Internal scaling allows summation of multiple IC output signals without changing the gain of external amplifiers. The resulting scaled signals 111i, 111q are filtered by respective lowpass filters 112i, 112q to produce the baseband I signal 11ri and Q signal 11rq. These signals 11ri, 11rq can be processed using the well known Hilbert transform into "left" and "right" audio signals for use in a stereo audio circuit (not shown) to be monitored by the user of the system. One ear will hear proper cardiac blood flow while the other ear will hear a reverse flow echo from a leaky or regurgitating heart valve.

Figure 3A:
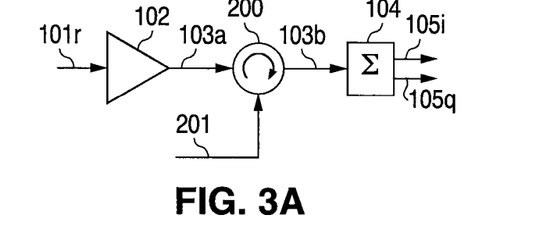
FIGS. 3A-3D are functional block diagrams of portions of the circuitry of FIG. 2 in which signal phases can be controlled in accordance with various embodiments of the presently claimed invention.

Referring to FIG. 3A, the estimated phase shift (discussed above) can be applied to the output signal 103a of the LNA 102 using controllable phase shift circuitry 200 in accordance with one or more phase shift control signals 201. The resulting phase-shifted input signal 103b is then distributed for quadrature demodulation using the quadrature clock signals 101i, 101q. As discussed above, the phase shift introduced via the phase shifter 200 may be similar or different among the various receive channels 100 in the receiver portion 12r of the array 10, and is intended to be dynamic with the capability of changing in microseconds.

Figure 3B:
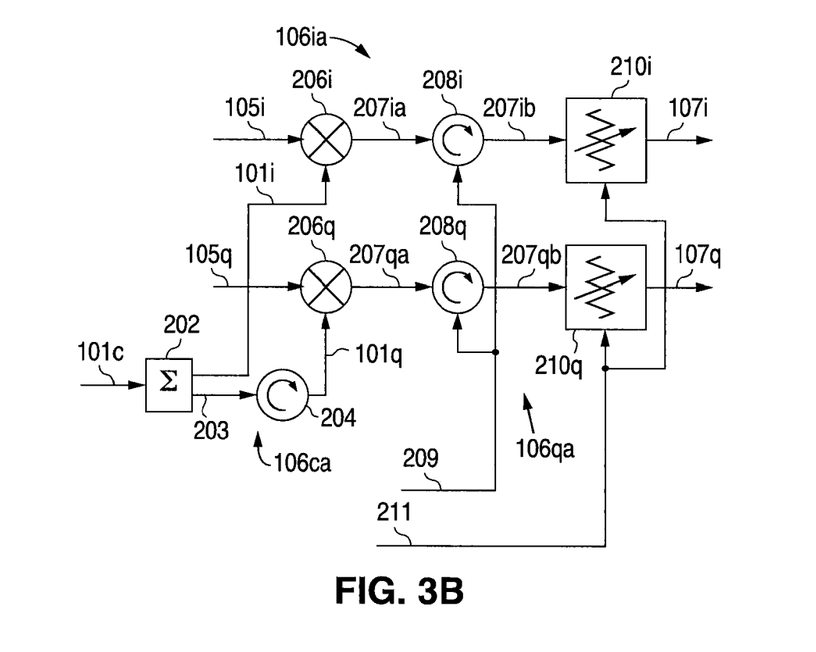

Referring to FIG. 3B, the I signal 105i and Q signal 105q are mixed (e.g., multiplied with respect to frequency) with the I clock signal 101i and Q clock signal 101q in respective signal mixing circuits 206i, 206q. The Q clock signal 101q is provided by phase shifting one of the signals 203 provided by the signal divider (magnitude) 202 via a fixed phase shift circuit 204. In accordance with one embodiment of the presently claimed invention, the estimated phase shift is applied further downstream individually to the I signal 207ia and Q signal 207qa via respective phase shifters 208i, 208q in accordance with one or more phase shift control signals 209 (discussed in more detail below). The resulting phase-shifted signals 207ib, 207qb retain their mutual quadrature phase relationship while both being rotated in phase in accordance with the estimated phase shift. Additionally, these signals 207ib, 207qb can be scaled in magnitude using scaling circuits 210i, 210q controlled in accordance with one or more magnitude scaling control signals 211 (discussed in more detail below).

Figure 3C:
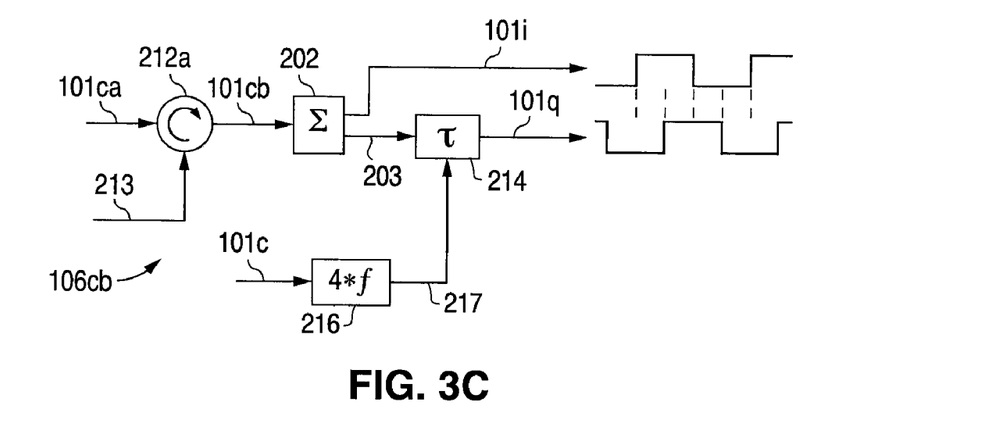

Referring to FIG. 3C, in accordance with another embodiment of the presently claimed invention, the estimated phase shift is introduced via the input clock signal 101 ca (which, as discussed above, has the same frequency as the transmit signal 11t carrier, and is shared by the two channels I, Q since it is the source of the quadrature clock signals 101i, 101q). This phase shift is introduced via a phase shifter 212a controlled by one or more phase shift control signals 213. The resulting phase-shifted clock signal 101cb is divided (magnitude) into two signals, one serving as the I clock signal 101i, and the other signal 203 being further phase shifted via a fixed phase shift circuit 214 to produce the Q clock signal 101q. In accordance with a preferred embodiment, this phase shifter 214 is a four-stage delay shift register which is clocked by a clock signal 217 having a frequency four times that of the original clock signal 101c. This can be done with a frequency multi-plier 216 (e.g., a phase-locked loop) that multiplies the frequency of the clock signal 101c by the factor of four.

While the incoming clock signal 101 ca, which is the source of the local oscillator signal, can be analog in form, thereby requiring an analog phase shifter 212a, it is preferable to use a digital clock signal 101 ca. This allows the phase shifter 212a to be implemented using shift registers (discussed in more detail below). This allows variable phase shifting to be performed easily using digital shift registers, with the time delay or angular resolution depending simply upon the granularity (frequency or fineness) of the master clock 101ca cycles and the number of divider delay stages. Additionally, the downstream signal divider 202 can be implemented using logic gates. Accordingly, with the quadrature clock signals 101i, 101q being digital, the demodulated signals 207ia, 207qa produced by the mixers 206i, 206q (FIG. 3B) will also be digital, i.e., square waves, consisting of the fundamental frequency and its odd harmonics. This significantly simplifies the requirements for the downstream lowpass filters 112i, 112q (FIG. 2).

Figure 3D:
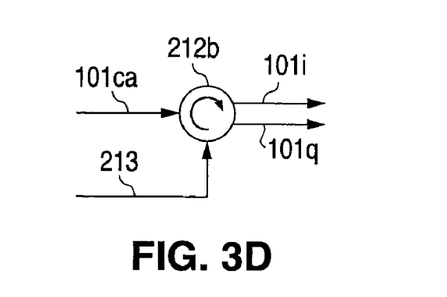

Referring to FIG. 3D, as discussed in more detail below, if the incoming clock signal 101ca is digital, it is possible for the phase shifter 212b to shift phase, in accordance with its one or more phase shift control signals 213, as well as mix signals simultaneously to produce the I and Q clock signals 101i, 101q (discussed in more detail below).

As discussed in more detail below, in accordance with the presently claimed invention, the respective channel signals 101r (FIG. 2) are individually rotated or aligned in one of 16 angles as determined by a multi-bit binary code provided via the appropriate control signals 209 (FIG. 3B), 213 (FIGS. 3C and 3D). Accordingly, the selected angles include 0, 22.5, 45.0, . . . , and 337.5 degrees. Each channel receives its own set of control bits. These 16 angles provide for a maximum ideal magnitude error of 1−cos(11.25 degrees), which equates to 1.92%.

Figure 4:
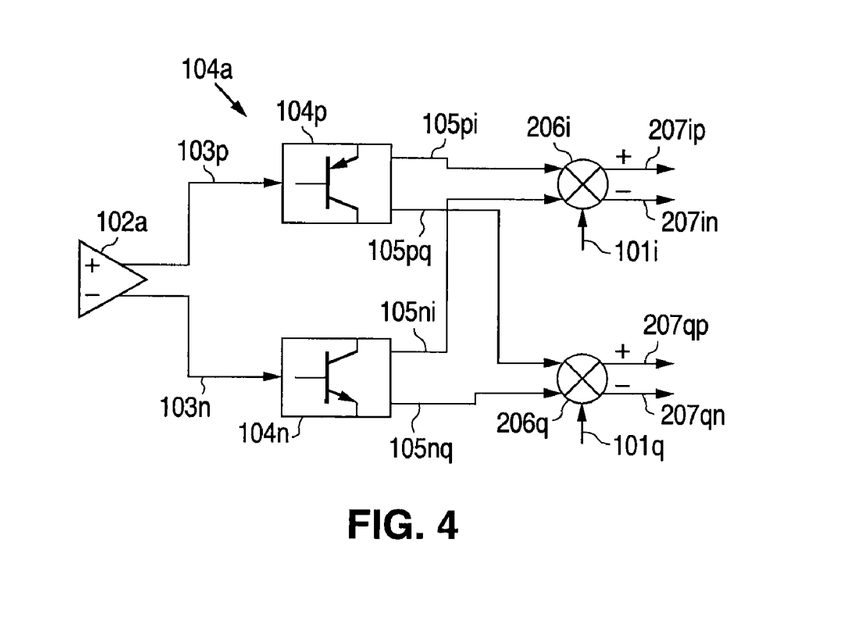
FIG. 4 is a functional block diagram of a portion of the circuitry of FIG. 2 for dividing the incoming signal to perform a quadrature signal demodulation.

Referring to FIG. 4, in accordance with an exemplary embodiment, the input LNA 102a provides a differential signal having positive 103p and negative 103n signal phases. These signals 103p, 103n drive the signal divider (magnitude) 104a which is implemented as two sets of unity gain sinking current mirror circuits 104p, 104n. The positive signal phase 103p is mirrored as two sinking output currents 105pi, 105pq. Similarly, the negative signal phase 103n is mirrored as two sinking output currents 105ni, 105nq. Current signals 105pi, 105ni from each of these current mirrors 104p, 104n are provided to the I signal mixer 206i. Similarly, additional current signals 105pq, 105nq from each of these current mirrors 104p, 104n are provided to the Q signal mixer 206q. These signals 105pi, 105ni, 105pq, 105nq are mixed with the clock signals 101i, 101q to produce a differential I signal 207i having positive 207ip and negative 207 in signal phases, and a differential Q signal 207q having positive 207qp and negative 207qn signal phases.

Figure 5A:
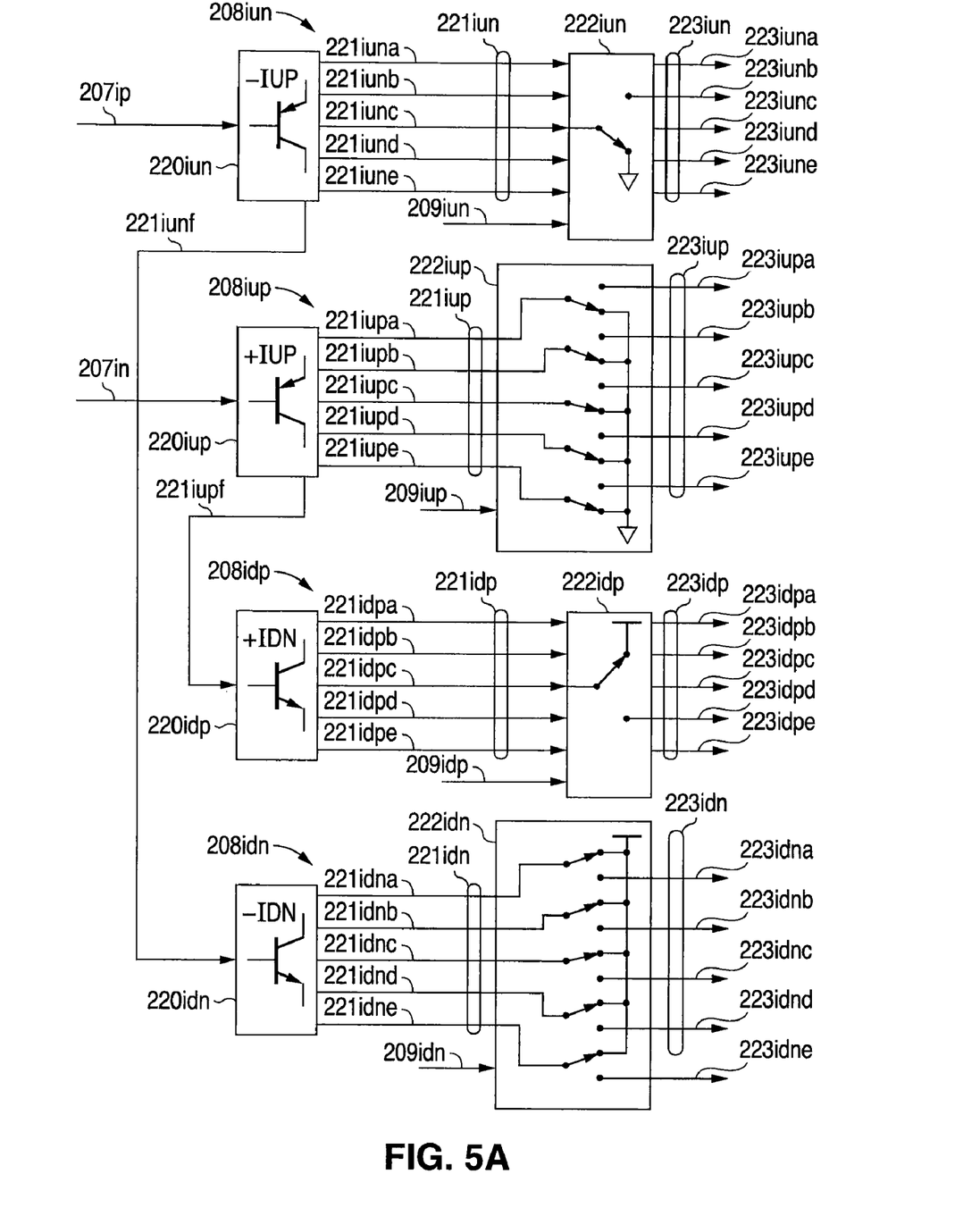
FIGS. 5A and 5B are functional block diagrams of current mirror circuitry used as part of the circuitry of FIG. 2 for controlling the phases of the quadrature demodulated signals in accordance with one embodiment of the presently claimed invention.
Figure 5B:
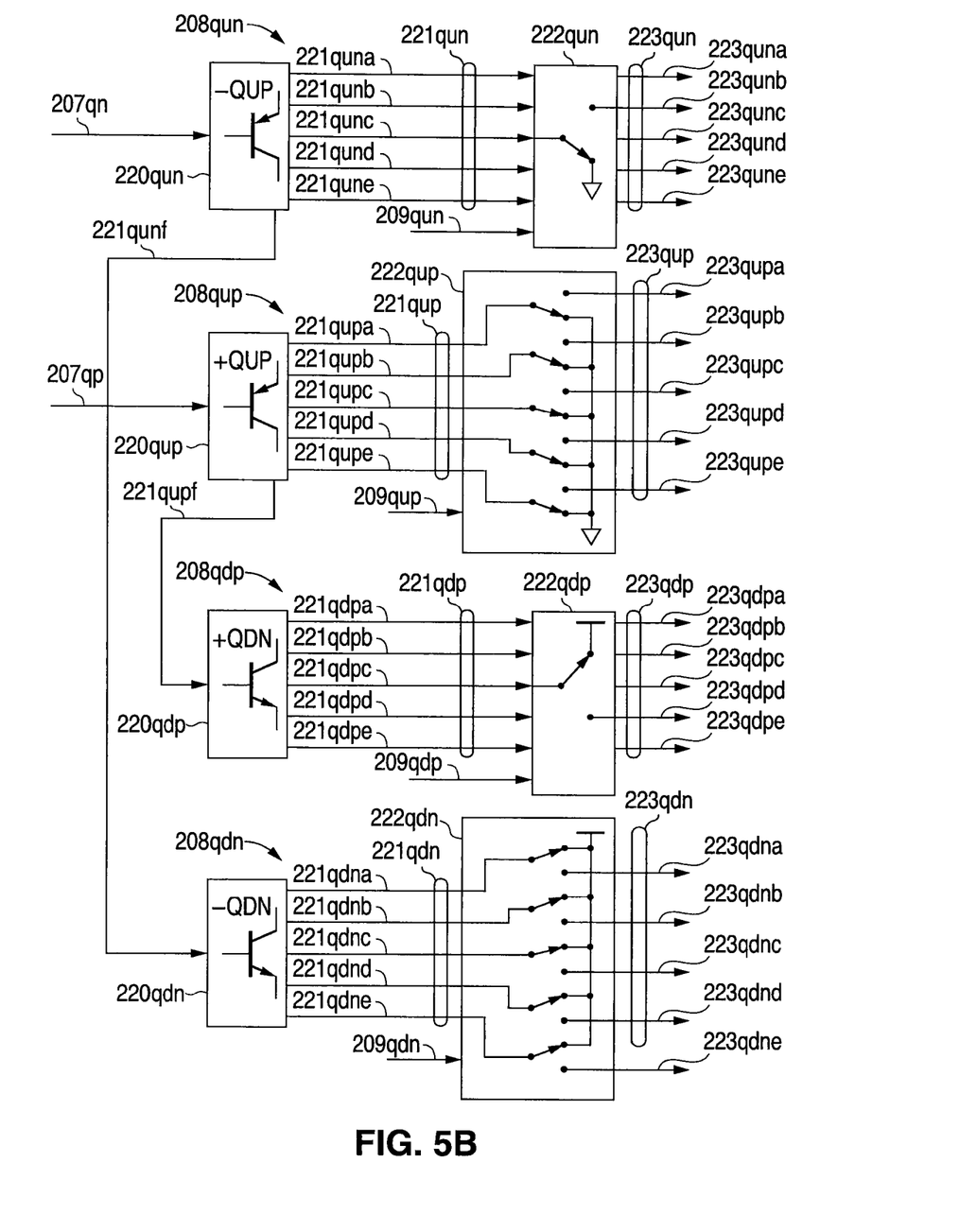

Referring to FIGS. 5A and 5B, in accordance with one embodiment of the presently claimed invention, the positive 207ip, 207qp and negative 207in, 207qn signal phases of the I signal 207i and Q signal 207q drive the phase shifters 208i, 208q (FIG. 3B). Referring to FIG. 5A, the I signal phase shifter 208i is implemented with four stages 208iun, 208iup, 208idn, 208idp, each of which includes a respective current source mirror circuit 220iun, 220iup or current sink mirror circuit 220idn, 220idp, and a respective output switching matrix 222iun, 222iup, 222idn, 222idp. These current source 220iun, 220iup and current sink 220idn, 220idp mirror circuits provide their respective output current signals 221i each of which is trigonometrically weighted relative to their respective input signals 207ip, 207in, 221iunf, 221iupf (each of the current source mirror circuits 220iun, 220iup also provides a unity gain output current 221iunf, 221iupf mirrored from its respective input current 207ip, 207in). In accordance with well known techniques, the relative dimensions of the transistors, values of their emitter resistances, or both, are used to implement the current mirror circuits 220iun, 220iup, 220idn, 220idp are selected so as to provide the desired trigonometric weighting of the mirrored currents.

Accordingly, the first source current mirror circuit 220iun provides five current signals 221iuna, 221iunb, 221iunc, 221iund, 221iune, each of which has a magnitude trigonometrically weighted relative to the input current 207ip with a respective one of the following values: −0.3827, −0.9239, −0.7071 (2 each), −0.9999. Similarly, the second current source mirror circuit 220iup provides five currents 221iupa, 221iupb, 221iupc, 221iupd, 221iupe with respective magnitudes trigonometrically weighted relative to the input signal 207 in: +0.3827, +0.9239, +0.7071 (2 each), and +0.9999. Further similarly, the first current sink mirror circuit 220idn provides five currents 221idna, 221idnb, 221idnc, 221idnd, 221idne having magnitudes trigonometrically weighted relative to its input signal 221iunf: −0.3827, −0.9239, −0.7071 (2 each), −0.9999. Further similarly, the second current sink mirror circuit 220idp provides five currents 221idpa, 221idpb, 221idpc, 221idpd, 221idpe having magnitudes trigonometrically weighted relative to its input signal 221iupf+0.3827, +0.9239, +0.7071 (2 each), and +0.9999.

In accordance with their respective control signals 209iun, 209iup, 209idn, 209idp, each of the switch matrixes 222iun, 222iup, 222idn, 222idp selects each of its respective input current signals 221iun, 221iup, 221idn, 221idp as its corresponding respective output current signal 223iun, 223iup, 223idn, 223idp, and directs unselected source currents to the circuit ground reference and unselected sink currents to the positive power supply node (thereby preventing base currents of the inactive, or unselected, devices from diverting base drive currents from the active, or selected, devices).

Referring to FIG. 5B, the Q signal phase shifter 208q is implemented with four stages 208qun, 208qup, 208qdn, 208qdp, each of which includes a respective current source mirror circuit 220qun, 220qup or current sink mirror circuit 220qdn, 220qdp, and a respective output switching matrix 222qun, 222qup, 222qdn, 222qdp. These current source 220qun, 220qup and current sink 220qdn, 220qdp mirror circuits provide their respective output current signals 221q each of which is trigonometrically weighted relative to their respective input signals 207qn, 207qp, 221qunf, 221qupf (each of the current source mirror circuits 220qun, 220qup also provides a unity gain output current 221qunf, 221qupf mirrored from its respective input current 207qn, 207qp). In accordance with well known techniques, the relative dimensions of the transistors, values of their emitter resistances, or both, are used to implement the current mirror circuits 220qun, 220qup, 220qdn, 220qdp are selected so as to provide the desired trigonometric weighting of the mirrored currents.

Accordingly, the first source current mirror circuit 220qun provides five current signals 221quna, 221qunb, 221qunc, 221qund, 221qune, each of which has a magnitude trigonometrically weighted relative to the input current 207qn with a respective one of the following values: −0.3827, −0.9239, −0.7071 (2 each), −0.9999. Similarly, the second current source mirror circuit 220qup provides five currents 221qupa, 221qupb, 221qupc, 221qupd, 221qupe with respective magnitudes trigonometrically weighted relative to the input signal 207qp: +0.3827, +0.9239, +0.7071 (2 each), and +0.9999.

Further similarly, the first current sink mirror circuit 220qdn provides five currents 221qdna, 221qdnb, 221qdnc, 221qdnd, 221qdne having magnitudes trigonometrically weighted relative to its input signal 221qunf: −0.3827, −0.9239, −0.7071 (2 each), −0.9999. Further similarly, the second current sink mirror circuit 220qdp provides five currents 221qdpa, 221qdpb, 221qdpc, 221qdpd, 221qdpe having magnitudes trigonometrically weighted relative to its input signal 221qupf: +0.3827, +0.9239, +0.7071 (2 each), and +0.9999.

In accordance with their respective control signals 209qun, 209qup, 209qdn, 209qdp, each of the switch matrixes 222qun, 222qup, 222qdn, 222qdp selects each of its respective input current signals 221qun, 221qup, 221qdn, 221qdp as its corresponding respective output current signal 223qun, 223qup, 223qdn, 223qdp, and directs unselected source currents to the circuit ground reference and unselected sink currents to the positive power supply node (thereby preventing base currents of the inactive, or unselected, devices from diverting base drive currents from the active, or selected, devices).

The current mirrors providing a weighting of 0.9999 have a gain of unity, a weighting of 0.38271 corresponds to the nominal sine of 22.5 degrees and cosine of 67.5 degrees, a weighting of 0.7071 corresponds to the nominal sine and cosine of 45 degrees, and a weighting of 0.9239 corresponds to the nominal cosine of 22.5 degrees and sine of 67.5 degrees. The current source mirror circuits 220iun, 220iup, 220qun, 220qup provide pull-up currents mirrored from the positive power supply electrode. The current sink mirror circuits 220idn, 220idp, 220qdn, 220qdp provide pull-down currents mirrored from the negative power supply electrode, or circuit reference ground in the case of a single power supply voltage.

Figure 6:
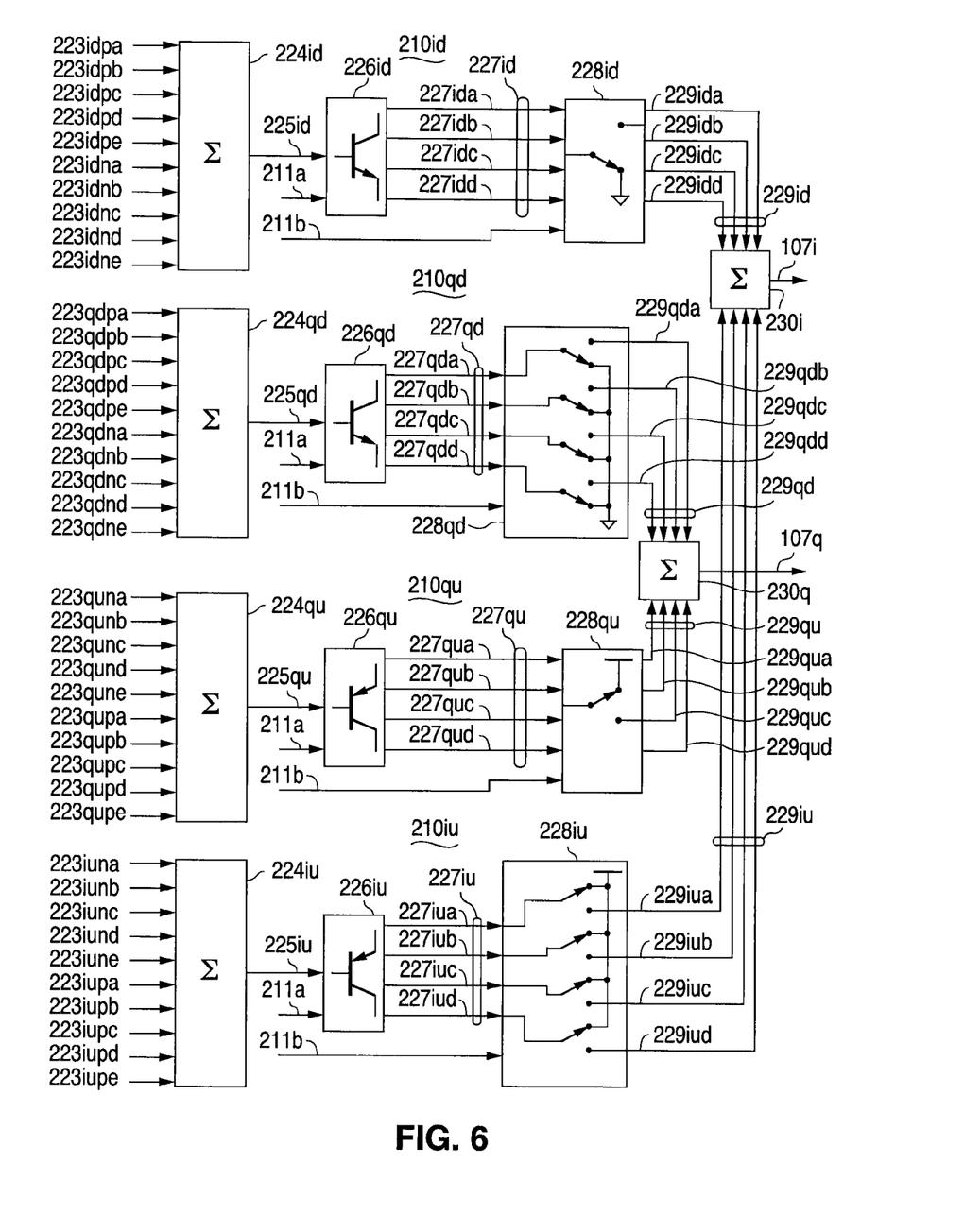
FIG. 6 is a functional block diagram of signal scaling circuitry for scaling the output signals of FIGS. 5A and 5B in accordance with another embodiment of the presently claimed invention.

Referring to FIG. 6, the selected trigonometrically weighted source currents 223iun, 223iup, 223qun, 223qup and sink currents 223idn, 223idp, 223qdn, 223qdp are summed (magnitude) together in respective current summing circuitry 224iu, 224qu, 224id, 224qd (e.g., respective shared circuit electrodes via which hard-wired current summing occurs). The resulting sum currents 225iu, 225qu, 225id, 225qd are scaled by respective thermometer-weighted signal scalers 210iu, 210qu, 210id, 210qd. Each input current 225iu, 225qu, 225id, 225qd is replicated by its respective current mirror circuit 226iu, 226qu, 226id, 226qd in accordance with one or more gain control signals 211a. The resulting scaled currents 227iu, 227qu, 227id, 227qd are individually selected or diverted to circuit ground reference or the positive power supply node (as discussed above for FIGS. 5A and 5B) by a respective switch matrix 228iu, 228qu, 228id, 228qd in accordance with one or more control signals 211b. The selected I signals 229iu, 229id are summed (magnitude) in a current summing circuit 230i (e.g., a common circuit electrode via which hard-wired current summing occurs) to produce the demodulated I signal 107i. Similarly, the selected Q signals 229qu, 229qd are summed (magnitude) in a current summing circuit 230q (e.g., a common circuit electrode via which hard-wired current summing occurs) to produce the demodulated Q signal 107q.

Figure 7:
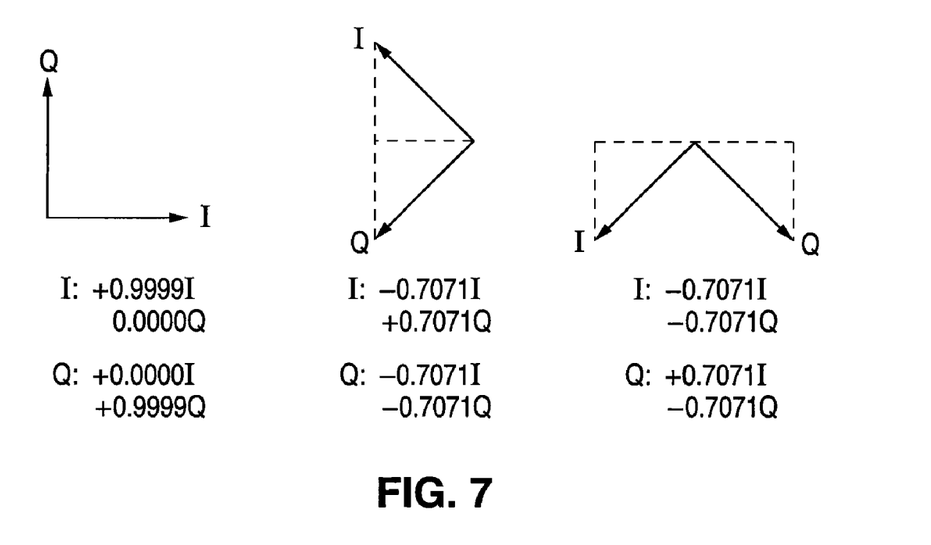
FIG. 7 illustrates phasor diagrams depicting signal phase control in accordance with the presently claimed invention.

Referring to FIG. 7, the phasor rotation discussed above can be better understood. At zero degrees, the preferred notation has the I phasor pointing toward 3:00 and the Q phasor pointing toward 12:00, each with a unit length. Initially, the I phasor at zero degrees is composed of +0.9999I and 0.0Q, while the Q phasor at 90 degrees is composed of 0.0I and +0.9999Q. When rotated to 135 degrees, the I phasor is composed of −0.7071I and +0.7071Q, while the Q phasor, now at 225 degrees, is composed of −0.7071I and −0.7071Q. Rotated to 225 degrees, the I phasor is composed of −0.7071I and −0.7071Q, while the Q phasor, now at 315 degrees, is composed of +0.7071I and −0.7071Q.

Figure 8:
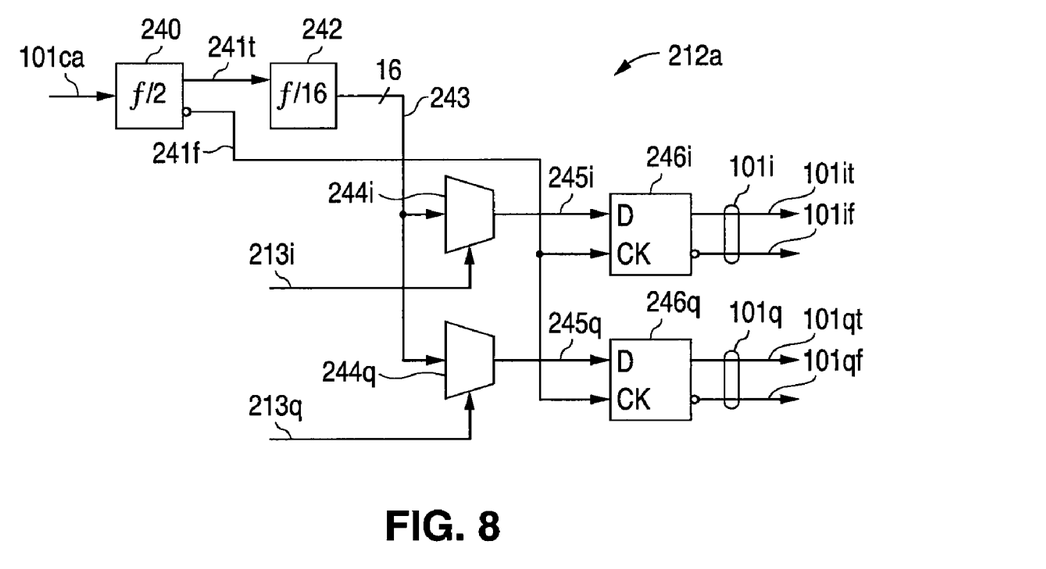
FIG. 8 is a functional block diagram of the clock circuitry of FIG. 2 in accordance with another embodiment of the presently claimed invention.

Referring to FIG. 8, in accordance with another embodiment of the presently claimed invention, the phase shifter 212a for the clock signal 101ca (FIG. 3C) includes frequency dividers 240, 242, multiplexors 244i, 244q and registers 246i, 246q, substantially as shown. The input clock signal 101ca is divided in frequency by a factor of two by the input frequency divider 240. This ensures that the resulting frequency-divided signals 241t, 241f have good signal symmetry regardless of the symmetry of the input signal 101ca. The "true" (i.e., non-inverted) output signal 241t is further divided in frequency by a factor of 16 by the second frequency divider 242 (discussed in more detail below), which produces 16 output signals 243, each of which has a respective one of 16 signal phases adjacent ones of which are mutually equidistant. (Alternatively, a half-frequency incoming clock can be frequency-divided by a factor of eight with 16 individual phases generated by logically ANDing both "true" and "false" register output signals.) Each of the signal multiplexors 244i, 244q, in accordance with its respective one or more control signals 213i, 213q, selects one of the 16 frequency-divided phase signals 243. Each of the selected signals 245i, 245q, which have mutually quadrature signal phases, are captured by the output registers 246i, 246q (e.g., D-type flip-flops) in accordance with the "false" (i.e., inverted) frequency-divided clock signal 241f to produce "true" 101 it, 101qt and "false" 101 if, 101qf versions of the I clock signal 101i and Q clock signal 101q.

Figure 9:
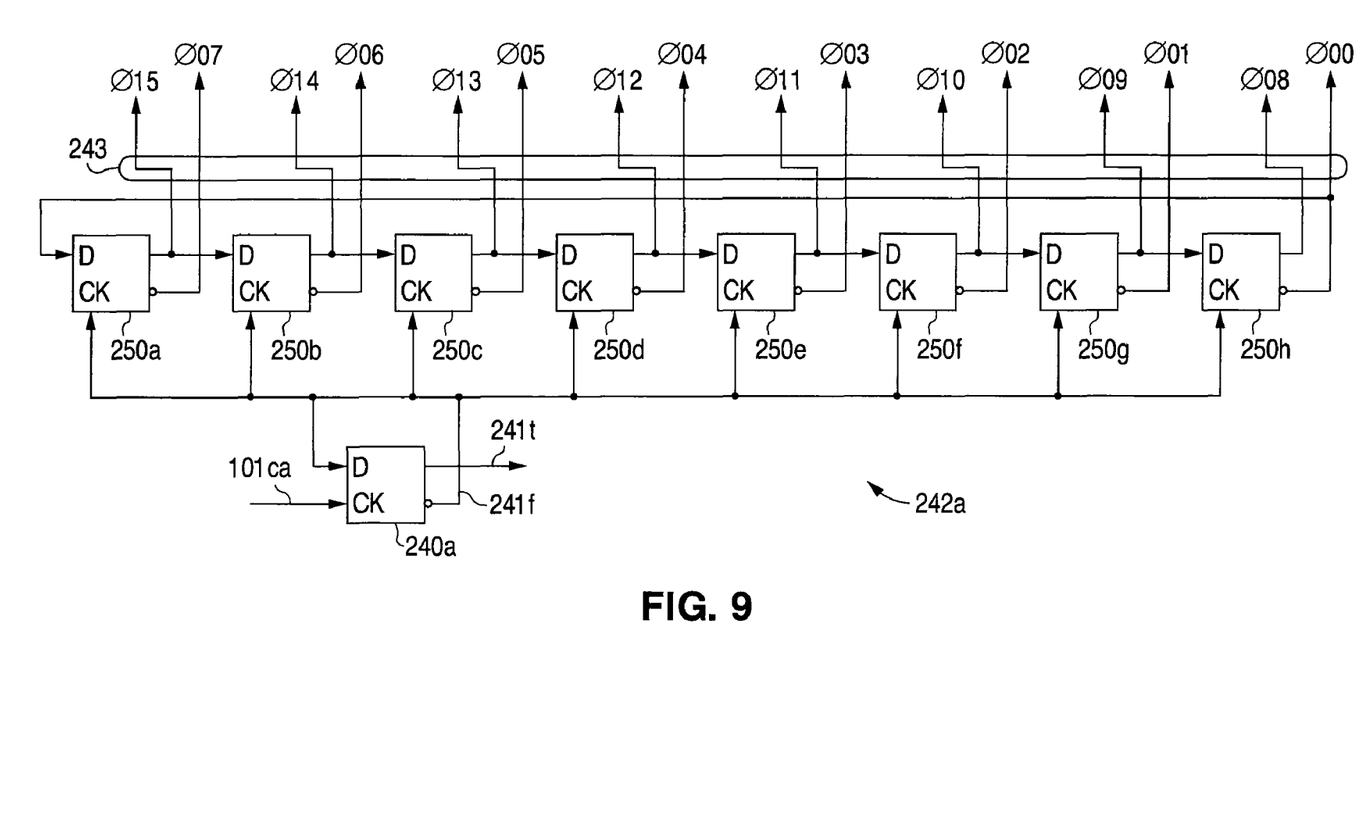
FIG. 9 is a logic diagram of an exemplary embodiment of the multi-phase frequency divider of FIG. 8.

Referring to FIG. 9, in accordance with a preferred embodiment, the divide-by-16 frequency divider 242 is implemented as a series 242a of registers 250a, 250b, 250c, 250d, 250e, 250f, 250g, 250h (e.g., each as a D-type flip-flop) interconnected as a ring counter, and clocked by the divide-by-to counter 240a (e.g., a D-type flip-flop). The 16 output signals 243 include output signals Ø00, Ø01, Ø02, ..., Ø15, having signal phases 0.0 degrees, 22.5 degrees, 45.0 degrees, ..., 337.5 degrees, respectively. Respective pairs of these signals 243 are selected by the multiplexors 244i, 244q, in accordance with the control signals 213i, 213q such that the selected signals 245i, 245q have mutually quadrature signal phases. For example, such signal pairs would include Ø00 and Ø12, Ø01 and Ø13, Ø02 and Ø14, Ø03 and Ø15, Ø04 and Ø0, Ø05 and Ø1, Ø06 and Ø2, Ø07 and Ø3, Ø08 and Ø4, Ø09 and Ø5, Ø10 and Ø6, Ø11 and Ø7, Ø12 and Ø8, Ø13 and Ø9, Ø14 and Ø10, or Ø15 and Ø11 for use as the Q clock signal 101q and I clock signal 101i, respectively.

With the use of respective pairs of these register output signals 243, as discussed above, for the I and Q clock signals 101i, 101q, circuit implementation is simplified significantly, since the phase shifters 208i, 208q (FIGS. 2, 5A and 5B) are unnecessary.

The signal scalers 110i, 110q (FIG. 2), 210i, 210q (FIGS. 3B and 6) can be used with any embodiment of the presently claimed invention to minimize external amplifier gain changes that may be needed as more circuit outputs are summed.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including quadrature signal demodulator circuitry, comprising:
a plurality of quadrature signal demodulator circuits each of which includes
signal routing circuitry responsive to a respective one of a plurality of received signals by providing corresponding first and second input signals, and
signal mixing circuitry coupled to said signal routing circuitry and responsive to said first and second input signals, one or more clock signals and respective one or more phase control signals by providing respective first and second output signals which are related to said first and second input signals, have substantially mutually quadrature signal phases, and are respective ones of first and second pluralities of output signals, respectively, wherein first and second ones of said first plurality of output signals have a first mutual signal phase difference, first and second ones of said second plurality of output signals corresponding to said first and second ones of said first plurality of output signals have a second mutual signal phase difference, and said first and second mutual signal phase differences are substantially equal;
signal scaling circuitry coupled to said plurality of quadrature signal demodulator circuits and responsive to one or more magnitude control signals by magnitude scaling said first and second pluralities of output signals to provide first and second pluralities of scaled output signals, wherein said first and second pluralities of output signals include first and second pluralities of current signals with said first and second mutual signal phase differences, respectively, and said signal scaling circuitry includes first current mirror circuitry responsive to said one or more magnitude control signals by scaling said first and second pluralities of current signals; and
output signal combining circuitry coupled to said plurality of quadrature signal demodulator circuits and responsive to said first and second pluralities of scaled output signals by providing first and second resultant signals, respectively.

2. The apparatus of claim 1, wherein each one of at least a portion of said first plurality of output signals has a respective signal phase mutually distinct from each other one of said at least a portion of said first plurality of output signals.

3. The apparatus of claim 1, wherein said signal routing circuitry comprises signal splitting circuitry and said first and second input signals have substantially mutually equal signal magnitudes.

4. The apparatus of claim 1, wherein said signal mixing circuitry comprises:
a plurality of mixer circuits responsive to said first and second input signals and said one or more clock signals by providing at least first and second mixed signals; and
second current mirror circuitry coupled to said plurality of mixer circuits and responsive to said at least first and second mixed signals and said one or more phase control signals by providing said first and second output signals.

5. The apparatus of claim 4, wherein said plurality of mixer circuits comprises:
a first mixer circuit responsive to said first input signal and a first one of said one or more clock signals by providing said first mixed signal; and a second mixer circuit responsive to said second input signal and a second one of said one or more clock signals by providing said second mixed signal, wherein said first and second ones of said one or more clock signals have substantially mutually quadrature signal phases.

6. The apparatus of claim 4, wherein said second current mirror circuitry comprises:
   a first plurality of current mirror circuits responsive to said first mixed signal by providing a first plurality of source currents and a first plurality of sink currents;
   a second plurality of current mirror circuits responsive to said second mixed signal by providing a second plurality of source currents and a second plurality of sink currents; and
   signal selection circuitry coupled to said first and second pluralities of current mirror circuits and responsive to said one or more phase control signals by selecting respective portions of said first and second pluralities of source currents and respective portions of said first and second pluralities of sink currents as said first and second pluralities of output signals.

7. The apparatus of claim 6, wherein:
   each one of said first plurality of source currents has a magnitude related to said first mixed signal in accordance with a respective one of a plurality of trigonometric functions;
   each one of said first plurality of sink currents has a magnitude related to said first mixed signal in accordance with a respective one of said plurality of trigonometric functions;
   each one of said second plurality of source currents has a magnitude related to said second mixed signal in accordance with a respective one of said plurality of trigonometric functions; and
   each one of said second plurality of sink currents has a magnitude related to said second mixed signal in accordance with a respective one of said plurality of trigonometric functions.

8. The apparatus of claim 1, wherein said signal mixing circuitry comprises:
   clock circuitry responsive to said one or more clock signals and said one or more phase control signals by providing first and second clock signals having substantially mutually quadrature signal phases; and
   a plurality of mixer circuits coupled to said clock circuitry and responsive to said first and second input signals and said first and second clock signals by providing at least first and second mixed signals.

9. The apparatus of claim 8, wherein said clock circuitry comprises:
   signal frequency division circuitry responsive to said one or more clock signals by providing a plurality of frequency-divided signals including a plurality of respective pairs of said frequency-divided signals having substantially mutually quadrature signal phases; and
   signal selection circuitry coupled to said signal frequency division circuitry and responsive to at least said one or more phase control signals and said plurality of frequency-divided signals by providing said first and second clock signals in relation to a selected one of said plurality of respective pairs of said frequency-divided signals.

10. The apparatus of claim 9, wherein:
    said signal frequency division circuitry comprises
      a first signal frequency divider circuit responsive to said one or more clock signals by providing first and second frequency-divided signals, and
      a second signal frequency divider circuit coupled to said first signal frequency divider circuit and responsive to said first frequency-divided signal by providing said plurality of frequency-divided signals; and
    said signal selection circuitry comprises
      logic circuitry responsive to said one or more phase control signals by selecting one of said plurality of respective pairs of said frequency-divided signals, and
      register circuitry coupled to said logic circuitry and responsive to said second frequency-divided signal by providing said selected one of said plurality of respective pairs of said frequency-divided signals as said first and second clock signals.

11. The apparatus of claim 10, wherein said second signal frequency divider circuit comprises a ring counter circuit.

12. The apparatus of claim 9, wherein said signal frequency division circuitry comprises ring counter circuitry.

13. The apparatus of claim 8, further comprising current mirror circuitry coupled to said plurality of mixer circuits and responsive to said at least first and second mixed signals by providing said first and second output signals.

14. The apparatus of claim 1, wherein said output signal combining circuitry comprises a plurality of current summing electrodes.

15. The apparatus of claim 1, further comprising filter circuitry coupled to said output signal combining circuitry and responsive to said first and second resultant signals by providing corresponding first and second filtered signals.

16. An apparatus including quadrature signal demodulator circuitry, comprising:
    a plurality of quadrature signal demodulator means each of which includes
      signal router means for routing a respective one of a plurality of received signals to provide corresponding first and second input signals, and
      signal mixer means for receiving said first and second input signals, one or more clock signals and respective one or more phase control signals and in response thereto providing respective first and second output signals which are related to said first and second input signals, have substantially mutually quadrature signal phases, and are respective ones of first and second pluralities of output signals, respectively, wherein first and second ones of said first plurality of output signals have a first mutual signal phase difference, first and second ones of said second plurality of output signals corresponding to said first and second ones of said first plurality of output signals have a second mutual signal phase difference, and said first and second mutual signal phase differences are substantially equal; and
    signal scaler means for receiving one or more magnitude control signals and in response thereto magnitude scaling said first and second pluralities of output signals to provide first and second pluralities of scaled output signals, wherein said first and second pluralities of output signals include first and second pluralities of current signals with said first and second mutual signal phase differences, respectively, and said signal scaler means includes current mirror means for receiving said one or more magnitude control signals and in response thereto scaling said first and second pluralities of current signals; and
    output signal combiner means for combining said first and second pluralities of scaled output signals to provide first and second resultant signals, respectively.

* * * * *